March 12, 1963     J. H. CRANKSHAW     3,080,732
SOUND ISOLATING MISALIGNMENT COUPLING
Filed Dec. 7, 1960     2 Sheets-Sheet 1
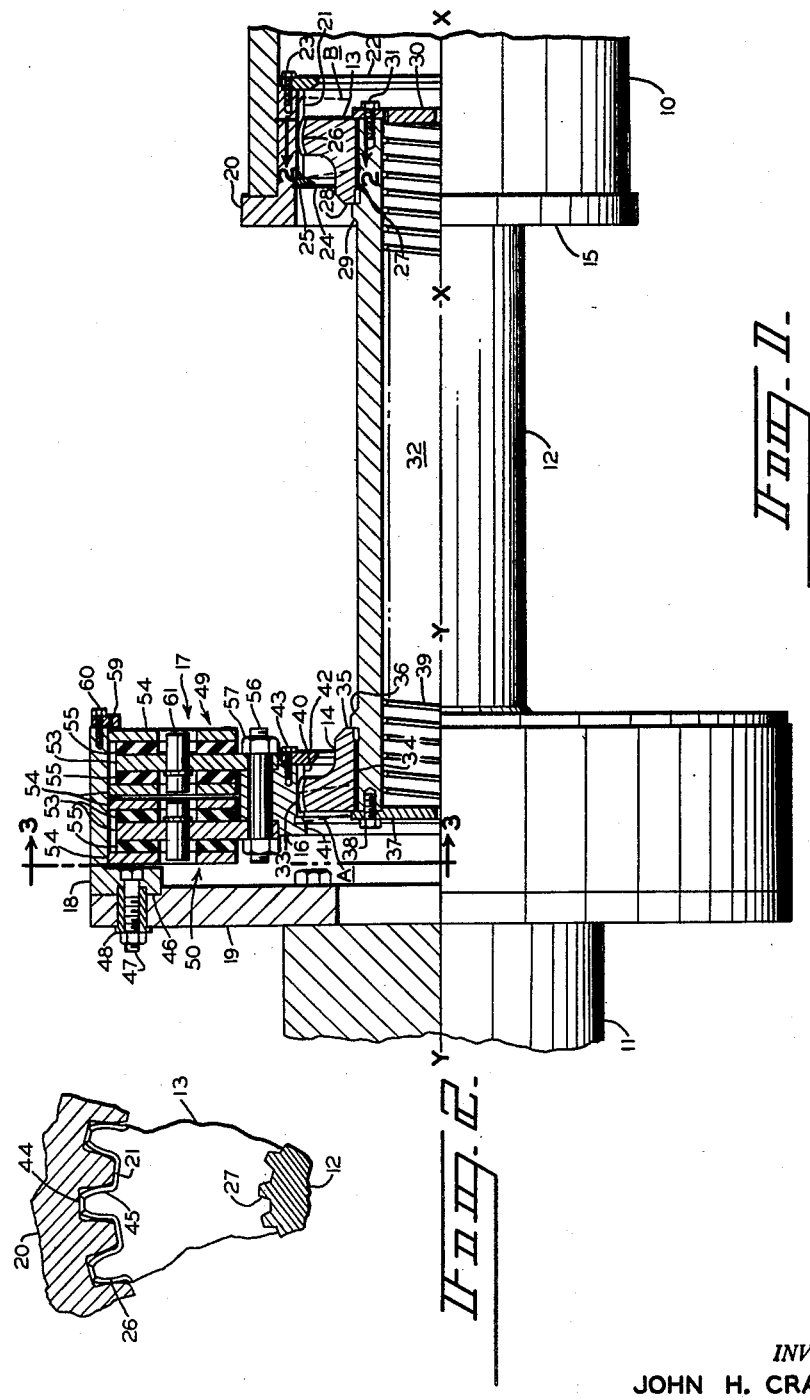
INVENTOR.
JOHN H. CRANKSHAW
BY Owen + Owen
ATTORNEYS March 12, 1963 J. H. CRANKSHAW 3,080,732
SOUND ISOLATING MISALIGNMENT COUPLING
Filed Dec. 7, 1960 2 Sheets-Sheet 2
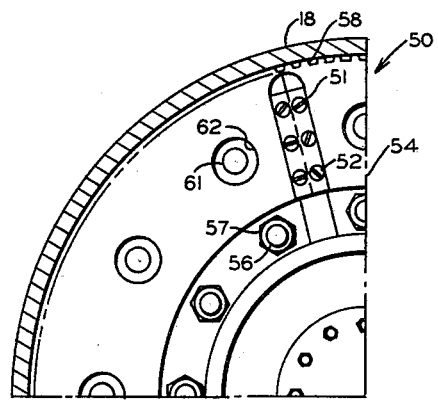
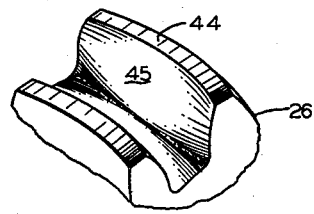
Fig. 4.
Fig. 3.
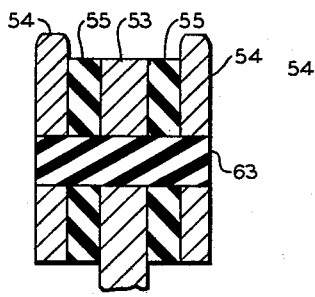
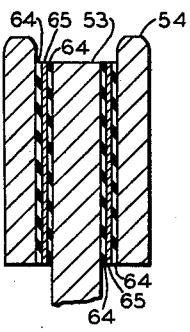
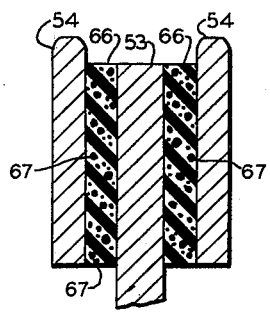
Fig. 5.  Fig. 6.  Fig. 7.
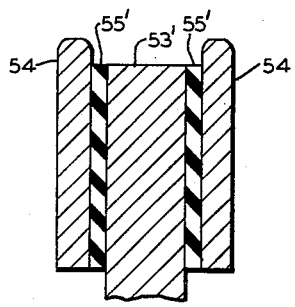
Fig. 8.
*INVENTOR.*
JOHN H. CRANKSHAW
BY Owen + Owen
ATTORNEYS

United States Patent Office 3,080,732
Patented Mar. 12, 1963

3,080,732
SOUND ISOLATING MISALIGNMENT COUPLING
John H. Crankshaw, Erie, Pa., assignor to Baldwin-Lima-Hamilton Corporation, Philadelphia, Pa., a corporation of Pennsylvania
Filed Dec. 7, 1960, Ser. No. 74,279
11 Claims. (Cl. 64—9)

This invention relates to a device for transmitting power between misaligned shafts, and more particularly to a gear-type misalignment coupling for connecting rotating shafts where the generation of sound producing vibrations must be reduced to a minimum and any remaining noise must be isolated from all surrounding supports and from the driven shaft. The coupling of the invention is especially useful for connecting a drive shaft to a propeller shaft in a ship, such as a submarine, where considerable power must be transmitted with a minimum of noise to prevent detection by sound tracking devices.

The conditions under which such a coupling must operate present difficult acoustical problems because the sound producing vibrations generated in couplings of this type are of many frequencies. Difficult structural problems likewise arise because the coupling must transmit very high torques under severe conditions of variable shaft misalignment. The structural problems are further complicated by weight limitations and size restrictions which are placed upon such couplings.

Further problems arise because heat generated by gear-type couplings during the transmission of high torques is destructive to the various parts of the coupling because this heat is concentrated in small tooth masses. Also the required size of the coupling may be such that it produces objectionable bending moments upon the supporting ship structure during the transmission of high torques.

It is, therefore, an object of the present invention to provide a coupling which will transmit power silently and efficiently from one shaft to another when the shafts are either aligned or misaligned, and which will function properly if the misalignment is parallel offset or angular, or both.

Another object of the invention is to provide a misalignment coupling which will transmit power positively and will attenuate noise producing vibrations.

A still further object of the invention is to provide a sound isolating misalignment coupling that will function properly for light or heavy torque loads.

Other and more specific objects of the invention will be apparent from the following specification wherein like numbers are used throughout to identify like parts, and from the drawings in which:

FIG. 1 is a part axial section, part side view of a misalignment coupling made according to the present invention;

FIG. 2 is an enlarged view in elevation taken along the line 2—2 in FIG. 1;

FIG. 3 is a sectional view taken along the line 3—3 in FIG. 1;

FIG. 4 is an enlarged perspective view of one of the teeth used in the coupling; and FIGS. 5 to 8 are sectional views of a portion of the noise isolating assembly of the coupling showing various embodiments of the laminated rings used therein.

In order to achieve the objects of the invention, there is provided a coupling which includes a misalignment portion and a sound isolating portion. The misalignment portion comprises a shaft having a hub mounted on each end, and each hub has external teeth which engage internal teeth in the bore of a mating sleeve at the respective ends of the shaft. One of the sleeves is directly connected to one of the misaligned shafts while the other sleeve is connected to the other misaligned shaft through the sound isolating portion of the coupling which includes laminated rings of a sandwich construction comprising spaced, rigid plates bonded to layers of resilient material interposed therebetween.

Referring now to the drawings, there is shown in FIG. 1 a sound isolating misalignment coupling that is used to transmit power between a rotating input shaft 10 which is connected to a prime mover, such as a marine power plant, and a driven output shaft 11 which may, for example, be connected to a propeller. In marine service, these shafts are quite large and the horsepower transmitted therebetween is usually quite high. To illustrate, the nominal torque transmitted between such shafts may be as high as 400,000 foot pounds, and it is possible that operating conditions may impose an overload of 150 percent to 200 percent of this rated loading.

The input shaft 10 is rotatable about an axis X—X which extends along its centerline while the output shaft 11 is likewise rotatable about a similar axis Y—Y. In shafts of this type the axes X—X and Y—Y are normally misaligned, and the misalignment may be "parallel offset" where the axes are parallel but offset from one another, or "angular" where the axes intersect at an angle to one another. Usually the misalignment of the shafts 10 and 11 is combined "parallel offset" and "angular." The shafts 10 and 11 are also axially misaligned when the shafts shift along their axes toward and away from each other during service.

The sound isolating misalignment coupling of the invention includes both a misalignment portion which is capable of accommodating combined "parallel offset" and "angular" misalignment as well as a sound isolating portion for attenuating noise producing vibrations generated by the rotation of the coupling and shafts. The misalignment portion comprises an intermediate member such as a shaft 12 located between the input shaft 10 and the output shaft 11 for rotation about its normal axis. A forward hub 13 is mounted on the end of the shaft 12 adjacent the input shaft 10 while a substantially identical hub 14 is mounted on the opposite end of the shaft 12 adjacent the output shaft 11. A torque transmitting member such as a sleeve 15 is mounted on the input shaft 10 and engages the forward hub 13 in a manner which will be described later in detail. Another torque transmitting member such as a sleeve 16 which is similar to the sleeve 15 engages the rear hub 14 in a manner which will likewise be described later in detail.

As shown in FIG. 1 the sleeve 16 is connected to the output shaft 11 for rotation about the axis Y—Y through a noise isolating assembly generally indicated at 17 which attenuates noise producing vibrations generated during the rotation of the shaft 12, the hubs 13 and 14, and the sleeves 15 and 16. The assembly 17 is engaged by an outer sleeve 18 that is supported by a plate 19 carried by the output shaft 11.

The sleeve 15 is mounted upon the input shaft 10 for rotation about the axis X—X in a conventional manner, such as by inserting the sleeve 15 into a suitable bore in the shaft 10 until an outwardly extending flange 20 formed on the rear end of the sleeve 15 is engaged by the end face of the shaft 10. The flange 20 is then rigidly secured to the end face of the shaft 10.

The sleeve 15 is generally tubular with a bore extending therethrough which contains a plurality of straight internal teeth 21. A circular retainer 22 is secured to the outer end of the sleeve 15 adjacent the teeth 21 by screws 23 while a ring 24 is mounted within an enlarged portion of the bore at the opposite end of the teeth 21 from the retainer 22. As shown in FIG. 1, the ring 24 engages the ends of the teeth 21 and is maintained in the enlarged portion of the bore by a second ring 25 which is received in a suitable groove formed in the inner wall of the sleeve 15. The retainer 22 and the ring 24 function not only to limit axial movement of the hub 13 within the sleeve 15, but also to retain lubricant in the teeth 21. The radial heights of the retainer 22 and the ring 24 are such that sufficient hydraulic head is provided for the lubricant. For example, when the sleeve 15 is rotating at 200 r.p.m., a lubricant such as oil, may move through the hub 13 and sleeve 15 at a rate of 10 g.p.m.

As shown in FIG. 1, the forward hub 13 is generally cylindrical with a bore extending therethrough and has a plurality of external teeth 26 formed on its outer surface which mesh with the internal teeth 21. The hub 13 is rigidly mounted on the shaft 12 by a spline indicated at 27. The hub 13 has an inner face 28 which engages a shoulder 29 formed on the shaft 12, and the hub 13 is retained on the end of the shaft 12 by a circular end cap 30 secured to the outer end of the shaft 12 adjacent the spline 27 by screws 31. The end cap 30 engages the hub 13 at the forward end of the spline 27, and a central portion of the cap 30 having an increased thickness covers a portion of the end of a bore 32 that is provided in the shaft 12 to reduce its weight. This thicker central portion is received within the bore 32 to properly position the cap 30.

The rear hub 14 is identical with the forward hub 13 and has a plurality of external teeth 33 formed on its periphery. The hub 14 is rigidly mounted on the shaft 12 by a spline indicated at 34, and a face 35 on the hub 14 engages a shoulder 36 on the shaft 12. The hub 14 is maintained on the shaft 12 by an end cap 37 that is identical with the end cap 30 by screws 38.

A coil spring 39 is maintained within the bore 32 of the shaft 12 by the end caps 30 and 37 to prevent the shaft 12, which is a hollow cylinder of steel, from ringing like a bell if struck. The free diameter of the coil spring 39 is slightly larger than the bore 32, and the spring 39 is wound upon its own axis prior to insertion in the bore 32. A radial force is imposed on the surface of the bore 32 by the spring 39 to dampen that noise whose intensity is sufficient to cause frictional dissipation of energy by the rubbing of the spring coils on the bore surface. Different radial pressures can be obtained to vary the sensitivity of the spring coils by inserting a torsion rod (not shown) along the axis of the spring 39 to keep it partially wound thereby decreasing the radial pressure on the bore 32.

The rear sleeve 16 is provided with a plurality of internal teeth 40 which are identical with the teeth 21 on the forward sleeve 15. The teeth 40 engage the teeth 33 to transmit torque between the hub 14 and the sleeve 16. Rearward movement of the shaft 12 and the hub 14 is limited by an inwardly directed flange 41 on one end of the sleeve 16, and the hub 14 is maintained within the sleeve 16 by a circular retainer 42 which is identical with the retainer 22 and is secured to the sleeve 16 by screws 43. The retainer 42 and the flange 41 also function to retain lubricant in the meshing teeth 33 and 40.

As shown in FIGS. 2 and 4, each of the external teeth 26 on the hub 13 has a crowned tip 44; that is, the top of each tooth on the addendum circle is curved. The tips of the teeth 33 which are identical with the teeth 26 are likewise crowned as shown in FIG. 1, and by crowning the tips of these teeth, "parallel offset" misalignment of the shafts 10 and 11 is accommodated. When the shafts 10 and 11 are so misaligned the hub 14 will pivot relative to the sleeve 16 to a position indicated by the dotted line A in FIG. 1, and the sleeve teeth 40 are somewhat longer than the hub teeth 33 to permit this movement.

The hub teeth 26 and 33 are finished at their outer tips in a curve whose radius is no greater than the root radius of the mating sleeve teeth 21 and 40. Otherwise the meshing teeth will bind when the hubs are misaligned with respect to the sleeves, and to allow free movement, some additional radial clearance is provided. Dynamic unbalance is likely to occur if the proper radial clearance is not provided.

However, when the coupling is operating at small amounts of misalignment it is desirable that this radial clearance between the tip of each hub tooth and the root of the mating sleeve tooth be kept as small as possible. Radial clearances in the order of .001 inch or less are satisfactory to maintain the sleeves and hubs concentric when the load is too low to achieve concentricity through the radial component of the tooth load.

Each of the teeth 26 also has crowned flanks 45; that is, the flank or side face of the tooth between the root circle and the addendum circle is curved. The flanks of teeth 33 are likewise crowned, and by crowning the flanks of the teeth 26 and 33, angular misalignment can be accommodated. Also the roots of the sleeve teeth 21 and 40 are relieved to prevent interference of the hub teeth 26 and 33 at this point.

When a gear-type coupling having the proper tooth spacing is run with the hubs and sleeves in exact alignment, the load is shared equally by all the teeth making the stresses theoretically equal. However, when the coupling is angularly misaligned, the load is concentrated on the ends of those hub teeth close to the axis about which the mesh is misaligned thereby decreasing the load capacity of the coupling. By crowning the flanks of the hub teeth, the point of tooth contact is prevented from reaching the ends of the hub teeth and the load carrying capacity of the coupling can be increased.

To illustrate the sizes of some of the components of the coupling as well as the curvatures utilized in the teeth, a pair of hubs 13 and 14, each having a pitch diameter of twenty-four inches, were mounted on a shaft 12 having an outside diameter of fourteen inches. The pitch circles of the teeth 26 and 33 were curved along the longitudinal axes of the hubs 13 and 14 in arcs of a circle having a radius of 8.875 inches while the tips of the teeth were crowned relative to the same axes along a circle having a radius of 12.25 inches. The flanks of the teeth were also crowned along a circular arc having a radius of 26.4 inches.

When the shafts 10 and 11 move toward and away from each other during axial misalignment, the hub teeth will slide axially between the sleeve teeth. For example, if the axes X—X and Y—Y are axially misaligned, the hub 13 will slide as shown by the dotted line B in FIG. 1. Consequently the sleeve teeth 21 are considerably longer than the hub teeth 26 to accommodate this sliding movement. While this reciprocating motion of the hubs 13 and 14 relative to the sleeves 15 and 16 may occur at both ends of the shaft 12, the greatest amount of this movement is preferably limited to the forward end of the shaft 12 by making the teeth 21 substantially longer than the teeth 40 as shown in FIG. 1.

Because the hubs 13 and 14 will orient themselves with respect to the sleeves 15 and 16 with a reciprocating pivotal motion to accommodate misalignment of the shafts 10 and 11, the sleeve 16 does not move relative to the axis Y—Y. Therefore, the assembly 17 maintains the sleeve 16 concentric with the outer sleeve 18, and fatigue in the various components of the assembly is reduced.

The plate 19 which carries the sleeve 18 is secured to the end of the output shaft 11 in a conventional manner, as by bolting, and an inwardly turned flange 46 on the end of the outer sleeve 18 is received in a relieved portion around the marginal surface of the plate 19. The flange 46 is secured to the plate 19 by bolts 47 which pass through bushings 48 in the plate 19. The bushings 48 protrude from the plate 19 and are received in matching holes in the flange 46. Thus all torque transmitted between the outer sleeve 18 and the plate 19 is transmitted through the bushings 48.

An important feature of the invention is the inclusion of the noise isolating assembly 17 between the sleeves 16 and 18. Noise may be defined as unwanted random frequency sound, and in the majority of the installations where the coupling is to be used no sound is wanted. Thus the transmission of all sound must be reduced as much as possible. As shown in FIG. 1, the assembly 17 comprises a pair of identical laminated annular rings 49 and 50, the ring 49 being secured to the forward end of the sleeve 16 and the ring 50 being secured to the rear end. If desired, the rings 49 and 50 may be made in segments and bolted together by locking plates 51 and screws 52 as shown in FIG. 3 to facilitate manufacture and assembly.

Each ring 49 and 50 utilizes a multiple shear sandwich construction comprising a rigid center plate 53 and a pair of spaced rigid end plates 54 located on oppositely disposed sides of the center plate 53. The thicknesses of the plates 53 and 54 are substantially identical. Layers 55 of resilient material are interposed between the end plates 54 and center plate 53 and are bonded thereto. The layers 55 are preferably of molded neoprene which has both a high mechanical strength for carrying loads and the ability to reduce the transmission of sound because of its high natural damping capacity at all frequencies. Neoprene is also resistant to the oil that is used to lubricate the teeth of the coupling.

Neoprene is conventionally stressed in compression, shear or combination of both, and the best sound damping is obtained when the layers 55 have the least amount of stiffness possible in any direction. Thus the layers 55 are loaded in shear because the shear modulus is about one fourth the modulus in compression.

Inasmusch as the layers 55 do not function to accept misalignment, the layers 55 are as soft as possible torsionally and sufficiently stiff in the axial and radial directions to be stable. Satisfactory results have been obtained when each neoprene layer 58 has a 40 to 50 durometer hardness.

The center plates 53 are connected to the rear sleeve 16 by a plurality of drive pins 56 which extend through holes provided in the ends of the center plates 53 and the rear sleeve 16. The drive pins are maintained in position by nuts 57 threadably secured at opposite disposed ends thereof. Spline teeth 58 are provided on the outermost ends of the end plates 54 to engage grooves formed in the bore of the outer sleeve 18. Rearward movement of the rings 49 and 50 is limited by the flange 46 while a retainer 59 secured to the forward surface of the sleeve 18 by bolts 60 limits movement of the noise isolating assembly 17 in the opposite direction.

The center plates 53 of the rings 49 and 50 as well as the rear sleeve 16, the rear hub 14 and half the weight of the shaft 12 are supported by the resilient layers 55, which are bonded to both the center plates 53 and the end plates 54, and transmission of noise is effectively prevented by the neoprene barrier. As torque is applied to the shaft 12, the center plates 53 twist circumferentially with respect to the end plates 54 because of the resilience of the layers 55 which transmit torque between the center plates 53 and the end plates 54. To protect the neoprene from overload torques, the center plates 55 carry a plurality of steel overload pins 61 that project into holes 62 in the end plates 54. The diameter of each of the holes 62 is substantially larger than the diameter of the pin 61 received therein so that the pin is maintained out of contact with the end plates 54 under normal full loads. However, the diameters of the holes 62 are sufficiently small that when the load reaches a predetermined value, say 200 percent of full load, the pins contact the sides of the holes 62 in the end plates 54 and carry the load through the metal to metal contact.

While the preferred embodiment of the invention has been illustrated in FIGS. 1 to 3, several different constructions of the noise isolating portions 17 may be utilized. These alternate embodiments are shown in FIGS. 5 to 8 and are concerned primarily with the flexible layers between the center plate 53 and the end plate 54.

Inasmuch as the weight of the parts suspended by the flexible layers 55 is quite high in large installations and may even reach 2500 pounds, radial stops in the form of resilient rods 63 may be provided as shown in FIG. 5. The rods 63 extend through the center plate 53 and the end plates 54 as well as the resilient layers 55. The rods 63 are preferably neoprene and are used in addition to overload pins (not shown). In contrast with the overload pins 61 shown in FIGS. 1 and 3 which engage the end plates 54 only when the coupling is overloaded, the rods 63 are constantly in contact with both the center plate 53 and the end plates 54.

In the embodiment shown in FIG. 6, a plurality of neoprene layers 64 are interposed between the plates 53 and 54. Not only are the individual layers 64 substantially thinner in cross section than the layers 55 shown in FIG. 1, but also the distance between the center plate 53 and each of the end plates 54 is reduced. Stiff metal plates 65 are interposed between the layers 64 and are bonded thereto.

Referring to FIG. 7, there is shown a pair of resilient layers 66 molded from a neoprene matrix having a durometer hardness from 40 to 50. Each layer 66 is reinforced by introducing a multitude of small neoprene particles 67 into the matrix prior to molding. The particles 67 are substantially harder than the matrix of the layer 66, and may, for example, have a durometer hardness between 80 and 90.

In FIG. 8 there is shown a center plate 53' having a thickness substantially greater than the thickness of the center plates 53 shown in FIG. 1. Neoprene layers 55' having thicknesses correspondingly less than the layers 55 of the preferred embodiment are interposed between the center plate 53' and the end plates 54. By increasing the thickness of the center plate 53', its natural frequency of vibration is raised into a higher range which is more easily attenuated by the thinner layers 55'.

While damping attenuates a major portion of the noise produced by the coupling, reflection and refraction in the resilient layers 55 as well as frictional losses in the coupling meshes and at the spline connection in the outer sleeve further add to the quietness of operation. The overall effectiveness of the sound isolating feature is also increased by the use of the damping spring 39 in the bore 32.

While various modifications of the invention have been shown and described, it should be expressly understood that other modifications and changes may be made without departing from the invention as defined in the appended claims.

I claim:

1. In combination with apparatus for transmitting power between rotating shafts wherein the apparatus includes a first toothed member connected to one of the shafts in meshing relationship with a second toothed member adapted to be connected to the other shaft; sound isolating means between the second toothed member and the other shaft for attenuating noise producing vibrations generated by the apparatus, said means comprising a plurality of spaced plates adjacent said second toothed member and said other shaft, means for connecting some of said spaced plates to said second toothed member, means for connecting the remaining spaced plates to said other shaft, and a plurality of resilient layers interposed between said spaced plates and in contact therewith.

2. Apparatus as claimed in claim 1, including a plurality of neoprene layers having a durometer hardness in the range between about 40 and 50, each of said layers being bonded to said spaced plates.

3. Apparatus as claimed in claim 1, including a plurality of stiff reinforcing plates bonded to resilient layers.

4. Apparatus as claimed in claim 1, including a plurality of particles interspersed within each of said resilient layers, said particles being substantially harder than said resilient layers.

5. In combination with apparatus for transmitting power between rotating shafts wherein the apparatus includes a first toothed member connected to one of the shafts and in meshing relationship with a second toothed member adapted to be connected to another shaft; sound isolating means connected to both the second toothed member and the other shaft for attenuating noise producing vibrations generated by the apparatus, said means comprising rigid plates mounted on said second toothed member, apertured plates spaced from said rigid plates, means for connecting said apertured plates to the other shaft, a plurality of resilient layers interposed between said rigid and apertured plates and secured thereto for transmitting torque therebetween, at least one pin carried by each of said rigid plates and extending into an aperture in each of said apertured plates, sufficient clearance being provided between said pin and said apertured plates to maintain said pin out of contact therewith when the torque transmitted by said plates is below a predetermined value and in contact therewith when said torque exceeds said predetermined value.

6. A coupling for transmitting power between rotating shafts having combined parallel and angular misalignment; said coupling comprising spaced members interposed between said shafts, a hollow cylindrical member rigidly secured to said spaced members for connecting the same for rotation about a common axis, a damping spring mounted within said hollow cylindrical member having a normal diameter greater than the interior diameter of said hollow cylindrical member to attenuate noise producing vibrations therein, crowned teeth formed on each of said spaced members, a torque transmitting member adjacent each of said spaced members, straight teeth formed on said torque transmitting member for engaging said crowned teeth, securing means for mounting one of said torque transmitting members on one of the shafts for rotation about the axis thereof, and connecting means for attaching another of said torque transmitting members to the other of the shafts for rotation about the axis thereof, said connecting means including a plurality of resilient members for attenuating noise producing vibrations generated by the rotation of said spaced members and said torque transmitting members, said crowned teeth having crowned flanks for accommodating angular misalignment of the shafts and crowned tips for accommodating parallel misalignment of the shafts.

7. A coupling for transmitting power between rotating shafts having combined parallel and angular misalignment; said coupling comprising spaced members interposed between said shafts, means rigidly connecting said spaced members for rotation about a common axis, crowned teeth formed on each of said spaced members, a torque transmitting member adjacent each of said spaced members, straight teeth formed on said torque transmitting member for engaging said crowned teeth, securing means for mounting one of said torque transmitting members on one of the shafts for rotation about the axis thereof, and connecting means for attaching another of said torque transmitting members to the other of the shafts for rotation about the axis thereof, said connecting means including a plurality of first plates carried by said other of said torque transmitting members, a plurality of second plates connected to said other of said shafts and spaced from said first plates, and a plurality of resilient members interposed between said first and second plates for attenuating noise producing vibrations generated by the rotation of said spaced members and said torque transmitting members, said crowned teeth having crowned flanks for accommodating angular misalignment of the shafts and crowned tips for accommodating parallel misalignment of the shafts.

8. In combination with apparatus for transmitting power between rotating shafts wherein the apparatus includes a first toothed member connected to one of the shafts in meshing relationship with a second toothed member adapted to be connected to the other shaft; sound isolating means between the second toothed member and the other shaft for attenuating noise producing vibrations generated by the apparatus, said means comprising a plurality of spaced plates adjacent said second toothed member and said other shaft, means for connecting some of said spaced plates to said second toothed member, means for connecting the remaining portion of said spaced plates to said other shaft, a plurality of resilient layers interposed between the spaced plates and in contact therewith, and means for limiting radial movement of said spaced plates relative to each other, said means comprising a resilient rod extending through said plates and said layers.

9. A coupling for simultaneously transmitting power between a pair of shafts having misaligned axes and for isolating noise produced therein; said coupling comprising spaced members interposed between said shafts, a hollow cylindrical member rigidly secured to said spaced members for connecting the same for rotation about a common axis, a damping spring mounted within said hollow cylindrical member having a normal diameter greater than the interior diameter of said hollow cylindrical member to attenuate noise producing vibrations therein, a torque transmitting member operatively connected to each of said spaced members, securing means for mounting one of said torque transmitting members on one of the shafts for rotation about the axis thereof, and connecting means for attaching another of said torque transmitting members to the other of the shafts for rotation about the axis thereof, said connecting means including a plurality of resilient members for attenuating noise producing vibrations generated by the rotation of said spaced members and said torque transmitting members.

10. A coupling for simultaneously transmitting power between a pair of shafts having misaligned axes and for isolating noises produced therein; said coupling comprising spaced members interposed between said shafts, means rigidly connecting said spaced members for rotation about a common axis, a torque transmitting member operatively connected to each of said spaced members, securing means for securing one of said transmitting members on one of said shafts for rotation about the axis thereof, and connecting means for attaching another of said torque transmitting members to the other of said shafts for rotation about the axis thereof, said connecting means including a plurality of first plates carried by said other of said torque transmitting members, a plurality of second plates connected to said other of said shafts and spaced from said first plates, and a plurality of resilient members interposed between said first and second plates for attenuating noise producing vibrations generated by the rotation of said spaced members and said torque transmitting members.

11. In combination with apparatus for transmitting power between rotating shafts wherein the apparatus includes the first toothed member connected to one of the shafts and in meshing relationship with a second toothed member adapted to be connected to another shaft; sound isolating means connected to both the second toothed member and the other shaft for attenuating noise producing vibrations generated by the apparatus, said means comprising a plurality of spaced parallel plates, means for connecting some of said plates to said second toothed member, means for connecting the remaining plates to said other shaft, a plurality of resilient layers interposed between said plates and secured thereto for transmitting torque therebetween, a plurality of pins extending from said some of said plates into apertures in said remaining plates, sufficient clearance being provided between said pins and said apertures to maintain said pins out of contact therewith when the torque transmitted by said plates is below a predetermined value and in contact therewith when said torque exceeds a predetermined value.

References Cited in the file of this patent

UNITED STATES PATENTS

| | | |
|---|---|---|
| 2,386,754 | Snyder | Oct. 16, 1945 |
| 2,592,309 | Meier | Apr. 8, 1952 |
| 2,841,966 | Belden et al. | July 8, 1958 |
| 2,900,809 | Crankshaw | Aug. 25, 1959 |
| 2,949,021 | Charlesworth | Aug. 16, 1960 |

FOREIGN PATENTS

| | | |
|---|---|---|
| 633,120 | Germany | July 20, 1936 |
| 731,081 | Great Britain | June 1, 1955 |